United States Patent [19]
Lewis et al.

[11] Patent Number: 5,347,281
[45] Date of Patent: Sep. 13, 1994

[54] FREQUENCY-CODED MONOPULSE MTI

[75] Inventors: Bernard L. Lewis, Oxon Hill, Md.; Ben H. Cantrell, Springfield, Va.

[73] Assignee: The United States of America as represented by the Secretary of the Navy, Washington, D.C.

[21] Appl. No.: 707,465

[22] Filed: Jul. 23, 1976

[51] Int. Cl.⁵ .................... G01S 13/52; G01S 13/58
[52] U.S. Cl. .................... 342/160; 342/116; 342/201; 342/202
[58] Field of Search .................... 343/7.7, 8, 17.2 R, 343/17.2 PC, 18 E; 328/133, 135; 342/116, 201, 202, 160

[56] References Cited

U.S. PATENT DOCUMENTS

| | | | |
|---|---|---|---|
| 3,163,862 | 12/1964 | Jenny | 343/17.2 R |
| 3,223,999 | 12/1965 | Groginsky | 343/17.1 R |
| 3,249,940 | 5/1966 | Erickson | 343/17.1 R |
| 3,631,490 | 12/1971 | Palmieri | 343/7.7 |
| 3,701,149 | 10/1972 | Patton et al. | 343/7.7 |
| 3,706,993 | 12/1972 | Kuck | 343/7.7 |
| 3,745,571 | 7/1973 | Chwastyk et al. | 343/17.2 PC |
| 3,905,033 | 9/1975 | Moore et al. | 343/7.7 |

*Primary Examiner*—Stephen C. Buczinski
*Attorney, Agent, or Firm*—Thomas E. McDonnell

[57] ABSTRACT

A pulse-compression, MTI, doppler-radar system for determining target velocity information from a single, frequency-coded uncompressed target-return pulse includes a coded modulator, two pulse compressors, and a phase-comparison processor. The coded modulator generates for transmission an uncompressed pulse with the first and second halves of the pulse coded with the even and odd harmonic sidebands of a pulse repetition frequency, respectively. The first and second halves of the pulse returning from the target are pulse compressed simultaneously by the two pulse compressors. The phase comparison processor then determines the phase difference between the compressed pulses to obtain the target velocity information.

3 Claims, 2 Drawing Sheets

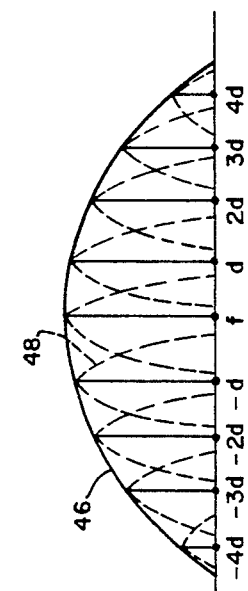
FIG. 4
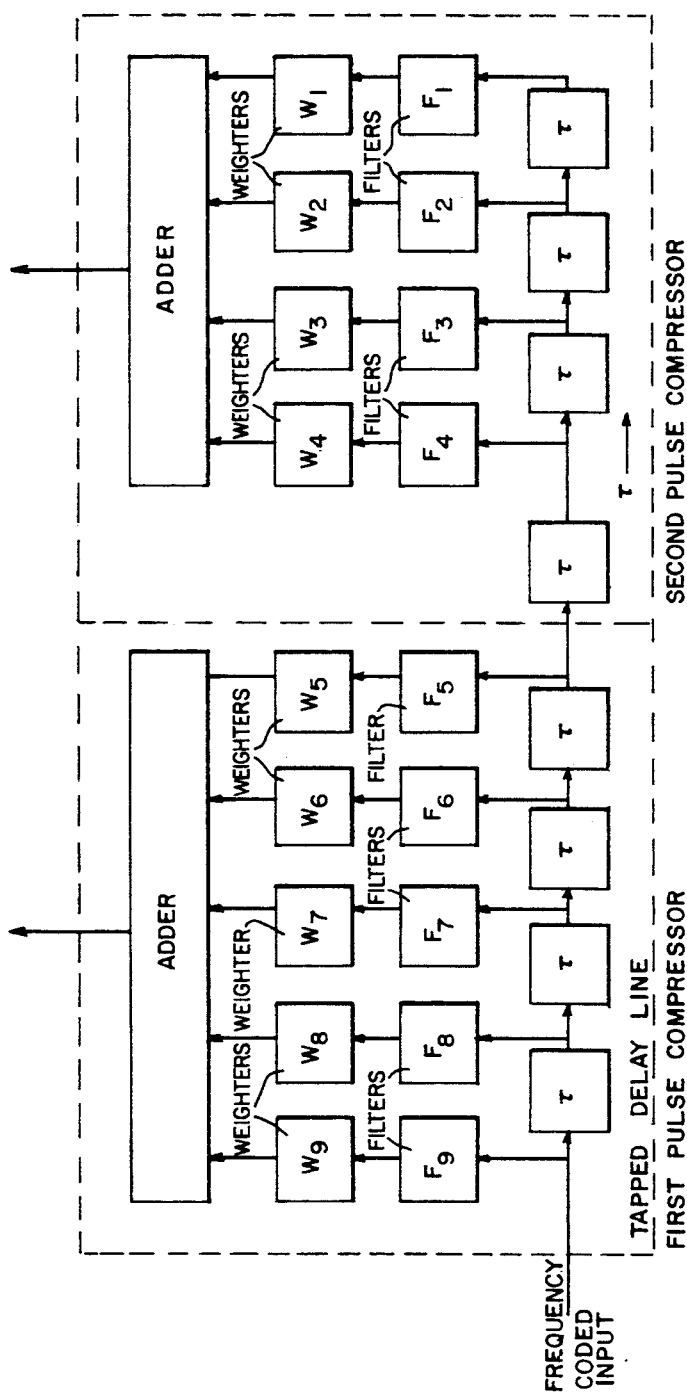
FIG. 2
| $f_9 =$ | $f_8 =$ | $f_7 =$ | $f_6 =$ | $f_5 =$ | $f_4 =$ | $f_3 =$ | $f_2 =$ | $f_1 =$ |
|---|---|---|---|---|---|---|---|---|
| $f+2d$ | $f-2d$ | $f+4d$ | $f-4d$ | $f$ | $f-d$ | $f+d$ | $f-3d$ | $f+3d$ |
| EVEN | EVEN | EVEN | EVEN | CAR-RIER | ODD | ODD | ODD | ODD |
| EVEN | EVEN | EVEN | EVEN | | ODD | ODD | ODD | ODD |
UNCOMPRESSED PULSE
FIG. 3

FREQUENCY-CODED MONOPULSE MTI

BACKGROUND OF THE INVENTION

1. Field of the Invention

The invention involves a pulse-compression, MTI, doppler-radar system for determining target velocity information from a single, frequency-coded uncompressed transmitted pulse. More specifically, the first and second halves of the uncompressed pulse (hereinafter target-return pulse), coded with even and odd harmonic sidebands of a pulse repetition center frequency, respectively, are pulse-compressed simultaneously and the phase difference therebetween compared to determine target velocity information.

2. Description of the Prior Art

Conventional moving-target indicators require that a radar or sonar transmit several sequential pulses of the same frequency to obtain target velocity information. It would be desirable to obtain such information from one pulse since this would allow the radar frequency to be changed on every pulse and thereby avoid jamming.

To solve this problem, phase-coded matched filters for pulse-compression, MTI, doppler-radar systems have been proposed that would act as doppler-filter banks yielding relatively coarse target velocity information on a single echo pulse. The theory for such a system is described in "Radar Signals", Cook and Bernfield, Academic Press, 1967, pp. 287–293. Such a system may determine between which pair of target blind speeds a target velocity may lie, but cannot specifically determine the exact target velocity.

This system is improved upon by copending Navy Case No. 60,003, U.S. application Ser. No. 700,925 entitled "Phase-coded Monopulse MTI" which describes a pulse-compression, MTI, doppler-radar system for determining target velocity information from a single, phase-coded uncompressed transmitted pulse. The system includes a pulse-compression filter consisting of at least two pulse compressors and a phase-comparison processor. The pulse compressors simultaneously pulse-compress separate portions of the single, phase-coded target-return pulse. The phase-comparison processor then determines the phase difference between the compressed pulses to obtain the target velocity information. This system determines target velocity from one target return pulse, but does not optimize the rejection of distributed clutter. More specifically, in a phase-coded system distributed clutter from the entire uncompressed pulse length contributes to pulse compressor sidelobes. This means that for a pulse compression ratio of N, there must be N phase-coded segments in the uncompressed pulse and N processing channels (i.e., time delay and weighter) to achieve good distributed clutter rejection.

What is needed is a pulse compression, MTI, doppler-radar system which will determine target velocity information from a single target-return pulse but will provide better rejection of distributed clutter and require fewer coded segments in the uncompressed pulse. As a result, fewer processing channels will be needed and equipment requirements will be simplified.

SUMMARY OF THE INVENTION

The present invention provides such a system which determines target velocity from a single, frequency-coded uncompressed target-return pulse. The system includes a coded modulator made up of a pulse generator which will provide a single pulse to a waveform-generator which generates a frequency-coded uncompressed pulse. One-half of the uncompressed pulse is frequency-coded with odd-harmonic sidebands of a pulse repetition frequency while the other half is frequency-coded with the even-harmonic sidebands. The pulse repetition frequency, which will be more fully described subsequenty is determined by the spacing between the center frequencies of filters in the waveform generator, with the pulse repetition interval being the reciprocal of the bandwidth of the filters. The uncompressed pulse is provided to a transmitter/receiver which transmits the signal and receives uncompressed target-return pulses. These pulses are provided to a pulse-compression filter which includes first and second pulse compressors. The first pulse compressor is for pulse-compressing one half of the frequency-coded target-return pulse. The second pulse compressor is for pulse-compressing the other half of the target-return pulse. The pulse-compressed signals are fed to a phase-comparison processor which compares the phase information between the two compressed pulses.

The inventive feature of the present invention is the use of a frequency-coded uncompressed pulse with the frequency segments ordered such that the odd and even sidebands of the pulse repetition frequency are in different halves of the pulse. This requires pulse compressors designed to separately pulse-compress each half of the uncompressed pulse.

One advantage of such a system is that filters used in the pulse compressors restrict the clutter range extent that can contribute to pulse compressor sidelobes to a range length of $$\frac{\tau C}{2}$$

where $\tau$ is the time width of the frequency-coded segments and C is the velocity of light. This is opposed to a range length of $$\frac{TC}{2}$$

for phase-coded segments of a phase-coded system where T is the uncompressed pulse length. The result is that for the same pulse-compression ratio the clutter of the frequency-coded system is reduced to the square-root of the clutter for the phase-coded system. For a pulse-compression ratio of N, the frequency-coded system needs only $\sqrt{N}$ frequency-coded segments and processing channels whereas the phase-coded system needs N coded segments and N processing channels. Another advantage is that regular line spacing in the frequency code permits better sidelobe reduction by amplitude weighting.

An object of the invention is to provide a pulse compression, MTI, doppler-radar system for determining target velocity from a single, frequency-coded uncompressed target-return pulse.

Another object is to provide such a system having improved rejection of distributed clutter.

Another object of such a system is to allow a change of frequency on each transmitted pulse to avoid electronic countermeasures.

BRIEF DESCRIPTION OF THE DRAWINGS

FIG. 2 is a schematic representation of a conventional pulse compressor for compressing frequency-coded pulses which is used to form two separate pulse compressors.

FIG. 3 is a diagrammatic representation of the transmitted frequency-coded uncompressed pulse.

FIG. 4 is a diagrammatic representation of the spectrums generated by the pulse and waveform generators.

BRIEF DESCRIPTION OF THE PREFERRED EMBODIMENT

Figure 1:
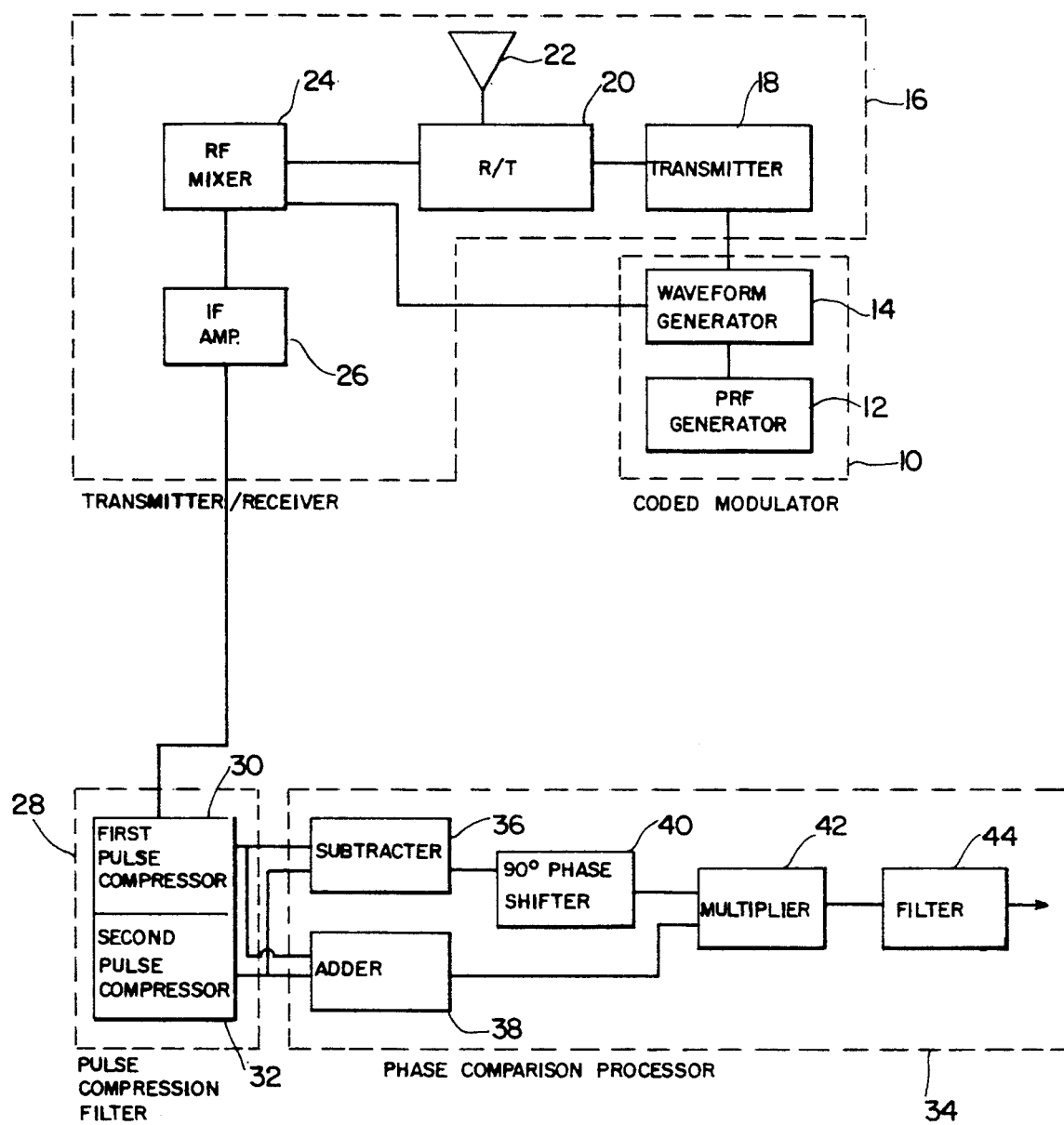
FIG. 1 is a block diagram representation of a pulse compression, MTI, doppler-radar system for determining target velocity from a single, frequency-coded uncompressed pulse.

A pulse compression, MTI, doppler-radar system for determining target velocity information from a single, frequency-coded target-return pulse is outlined in FIG. 1. A coded modulator 10 contains a pulse generator 12 which provides single pulses to a waveform generator 14. Waveform generator 14 is a frequency coder for generating a frequency-coded uncompressed pulse which is made up of a number of segments each having a different frequency. The frequency-coding scheme is described subsequently with reference to FIG. 3. Waveform generator 14 is of a standard type such as that described in Nathanson "Radar Design Principles", Chapter 13, McGraw Hill, 1969. Pulse compression filter 28 is the same apparatus as the waveform generator 14 described in the Nathanson reference. The only difference is that when the apparatus is used as waveform generator 14 the single pulse from pulse generator 12 is entered at one end of a tapped delay line in the apparatus and when the apparatus is used as pulse compression filter 28 the received uncompressed pulse is entered at the other end of the tapped delay line. Such an arrangement is known in the art and described in "Radar Signals", Cook and Bernfeld, Academic Press, 1967, p. 286. Coded modulator 10 is connected to a conventional, pulse-compression, doppler-radar transmitter/receiver unit 16 which operates at L band, typically 1200 MHz, and includes transmitter 18, R/T unit 20, antenna 22, RF Mixer 24, and IF amplifier 26.

Connected to IF amplifier 26 is pulse-compression filter 28 which is composed of first pulse compressor 30 and second pulse compressor 32 which are shown in detail in FIG. 2 and described. First pulse compressor 30 is matched to the portion of waveform generator 14 which frequency-codes the last half of the radar-return pulse such that the last half of the radar-return pulse autocorrelates optimally in first pulse compressor 30. In the same manner, second pulse compressor 32 is matched to the portion of waveform generator 14 that frequency-codes the first half of the uncompressed pulse. The carrier frequency is pulse-compressed along with the half of the pulse having the even sideband frequency-coded segments. In summary, first and second pulse compressors 30, 32 autocorrelate the last and first halves of the target-return pulse, respectively, to produce a separate pulse-compressed signal for each half.

The pulse-compressed signals are fed to a conventional phase-comparison processor 34 normally used in phase-comparison angle-tracking radars as described in Skolnik, "Radar Handbook", pages 21-27. Specifically, the pulse-compressed output from first pulse compressor 30 is fed to both subtracter 36 and adder 38. Likewise, the output of second pulse compressor 32 is fed to both subtracter 36 and adder 38. The output of subtracter 36, a difference signal, is fed to 90° phase shifter 40 which shifts the phase of the difference signal by 90°. The phase-shifted difference signal and the sum signal from adder 38 are fed to multiplier 42 which produces a video pulse which will indicate whether a target is stationary or moving. The video pulse is then fed through filter 44 which passes only the video pulse and excludes all other signals.

FIG. 2 shows one embodiment of first and second pulse compressors 30 and 32. First pulse compressor 30 is made up of half of a tapped delay line having outputs at time delay spacings of $\tau$. The outputs from this portion of the tapped delay line are fed to filters $F_5$ through $F_9$. Filter $F_5$ is tuned to pass the carrier frequency and filters $F_9$ through $F_6$ all pass the even sideband frequencies of the received uncompressed pulse shown in FIG. 3 to be described subsequently. The outputs of filters $F_5$ through $F_9$ are connected to weighters $W_5$ through $W_9$, respectively, whose outputs in turn are provided to an adder. Pulse compressor 32 is made up of the second half of the tapped delay line with time delays, filters $F_1$ through $F_4$, weighters $W_1$ through $W_4$ and an adder which operate in the same manner as in pulse compressor 30 for the odd harmonics of the received uncompressed of the pulse shown in FIG. 3. Note that in pulse compressor 32 there is no filter and weighter for the carrier frequency.

FIG. 3 shows the uncompressed pulse generated by waveform generator 14. To understand how the uncompressed pulse is formed it is necessary to examine closely how waveform generator 14 works. As stated previously, waveform generator 14 is identical to the pulse compression filter shown in FIG. 2 except that the single pulses from pulse generator 12 enter the tapped delay line from the right side (i.e., Filter $F_1$). The spectrum of each single pulse generated by pulse generator 12 can be represented by the continuous spectrum, curve 46, shown in FIG. 4. To form the frequency-coded uncompressed pulse, this spectrum must be broken up into overlapping frequency bands 48 with each frequency band representing one frequency segment of the uncompressed pulse. The frequency bands must overlap at least at their 3 db points to make sure that the sum of the frequency bands exactly recreates the spectrum of curve 46. This is required to make sure that the uncompressed pulse generated has a non-periodic nature. Waveform generator 14 performs the function of receiving a single pulse from pulse generator 12 and separating the spectrum of the single pulse into the overlapping frequency bands for use in the uncompressed pulse.

Waveform generator 14 contains filters $F_1$ to $F_9$ (FIG. 2) each of which has a bandwidth which will pass one of the overlapping frequency bands. As a pulse is received at the right side of the tapped delay line of FIG. 2, the pulse encounters filter $F_1$, which passes the frequency band having a center frequency of $f+3d$. This will be the first frequency component $f_1$ of the uncompressed pulse of FIG. 3. Likewise, as the single pulse arrives at filter $F_2$, at time $\tau$ later, the filter will pass a center frequency of $f-3d$. This is the second frequency component $f_2$. Filters $F_1$ to $F_9$ pass the appropriate frequencies to obtain the coded uncompressed pulse of FIG. 3 with the even and odd harmonics of the pulse repetition frequency in different halves of the pulse. The pulse repetition frequency is determined by the spacing of the center frequencies of the filter and is equal to or less than $1/\tau$. The carrier frequency will be passed by filter $F_5$ and will be the center segment of the uncompressed pulse. The ordering of the frequencies makes the frequency-coding compatible with MTI, i.e., the relative phases of the compressed echo pulses from the two halves of the uncompressed pulse will only differ due to target motion between halves.

FIG. 4 shows the frequency spectrum 46, for a pulse generated by pulse generator 10. The spectrum is also shown as broken up into frequency bands 48 whose center frequencies are spaced by a frequency d which is less than or equal to $1/\tau$. This is the pulse repetition frequency, The even harmonics are represented by $\pm 2d$ and $\pm 4d$ and the odd harmonics are represented by $\pm d$ and $\pm 3d$. The center frequency is f.

In operation, pulse generator 12 of FIG. 1 will generate a pulse whose spectrum is shown as 46 in FIG. 4 and which is fed to waveform generator 14. Waveform generator 14 generates an uncompressed pulse shown in FIG. 3 which is frequency-coded with a number of segments (line 48 in FIG. 4) having different frequencies. The uncompressed pulses is transmitted and target-return pulses received by transmitter/receiver 16.

In general, the target-return pulse from a moving target will have a phase change between its first and second halves. The target-return pulse is split up into a first half and a second half which are pulse-compressed separately and simultaneously such that the phases of the two compressed halves may be compared to determine the phase difference and hence target velocity and direction. This allows phase information received at different points in time (i.e., first and second halves of the pulse) to be converted by pulse compression to the same time base such that the desired comparison of phase information may be made.

Looking at pulse-compression filter 28 more closely, the first and second halves of the frequency-coded uncompressed target-return pulse are pulse-compressed simultaneously by second and first pulse compressors 32, 30, respectively.

To accomplish this, the first frequency segment transmitted ($f_1$) is received from the target first and enters the tapped delay time shown in FIG. 2. The taps are separated by delays $\tau$ equal to the time spent in transmitting each frequency segment. As $F_1$ progresses down the tapped delay line, it will not pass through any of the filters until it reaches filter $F_1$ tuned to pass frequency $f_1$. As the same time, frequency $f_2$, which follows frequency $f_1$ by a delay period t, passes through filter $F_2$ tuned to frequency $f_2$. Similarly, frequencies $f_3$ through $f_9$ pass through the remaining filters simultaneously. The outputs from each tap of the delay line are then fed to the respective weighters $W_1$ through $W_9$ which weight each frequency to impress the same spectral envelope on both halves of the uncompressed pulse to reduce sidelobes and to make both compressed halves have the same time function (i.e., pulse shape). The outputs of the weighters are then summed in the two adders and two compressed pulses, having the same pulse shape, simultaneously exit from the adders.

Returning to FIG. 1 both the first and second half compressed pulses are fed simultaneously to subtracter 36 and adder 38. In subtracter 36, a difference signal is produced which reflects the vector difference of the amplitude and phase of the compressed pulses. In adder 38, a sum signal is produced which reflects the vector sum of the amplitude and phase of the compressed pulses. Equal-amplitude compressed pulses produce difference signals with 90 and 270 degree phases with respect to the sum signal, while compressed pulses with amplitude differences produce 0 or 180 degree phase relationship between the sum and difference signals.

The difference signal from subtracter 36 is fed to phase shifter 40 where the phase is shifted 90°. This is necessary to bring the sum and difference signals into phase coincidence or opposition since the sum and difference vectors are orthogonal to each other for phase differences between the input compressed pulses. The phase-shifted difference is then fed to multiplier 42 where it is multiplied with the sum signal from adder 38. The product of the multiplication is zero for zero phase difference but finite amplitude difference. If the phase difference is not zero, the product is a video pulse whose magnitude is proportional to the phase difference and whose sign indicates whether the target is approaching or going away from the radar. The zero response to amplitude differences makes this MTI tolerant of amplitude modulation on the transmitted pulses. If the video pulse has magnitude, this indicates the target is moving with a velocity proportional to the amplitude of the video pulse and in the direction indicated by the sign of the pulse.

As indicated hereinbefore, use of a frequency-coded system improves rejection of distributed clutter and lessens the complexity of the pulse-compression apparatus needed. What makes the use of frequency coding possible is the ordering of the uncompressed pulse with even and odd sidebands in different halves of the pulse. Use of this scheme allows both compressed pulse halves to be centered about the carrier frequency $F_5$ shown in FIG. 3. This is important since any frequency change between the center frequencies of the compressed pulses would introduce a phase change which would affect the accuracy of the velocity measurement. Previously, MTI radars using frequency coding had to use two successive pulses of the same frequency to obtain accurate target velocity information. This type of radar is susceptible to jamming.

This invention could be used to detect moving targets at ranges less than that of any stand-off jammer operating in fast-set-on-spot jamming mode. The radar could change carrier frequencies on a pulse-to-pulse basis and the jammer would not know what the radar's new frequency was until the radar's pulse was received by the jammer and the jammer measured the radar's signal. This spot jammer would then start jamming on the new frequency but its jamming signals would take time to get back to the radar. In the meantime, the radar would be receiving unjammed echoes from targets between the radar and the jammer. In normal tactics, spot jammers operate from 50 to 100 miles away from a radar they are jamming. This would insure a useful unjammed range for the radar employing this invention and pulse-to-pulse frequency changes.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A pulse-compression, MTI, doppler-radar system for determining target velocity from a single, frequency-coded, uncompressed target-return pulse, and including a transmitter/receiver, said system comprising:

coded modulator means for generating a frequency-coded uncompressed pulse having segments of one half of said frequency-coded uncompressed pulse which are frequency-coded with odd harmonic sidebands of a pulse repetition frequency and segments of the other half coded with even harmonic sidebands of said pulse repetition frequency and a center segment coded with a carrier frequency, said frequency-coded uncompressed pulse provided to said transmitter/receiver;

pulse-compression filter means receiving the output of said transmitter, said pulse-compression filter means including first and second pulse compressors, the first said pulse compressor for pulse compressing one-half of said frequency-coded target-return pulse and the second said pulse compressor for pulse compressing the other half of said frequency-coded target-return pulse; and phase-comparison processor means receiving the pulse-compressed signals from said first and second pulse compressors for comparing the phase information between the pulse compressed signals from said first and second pulse compressors.

2. A system as set forth in claim 1, wherein said coded modulator includes:

pulse generator means for generating single pulses; and waveform generator means receiving said single pulses for generating a frequency-coded uncompressed pulse from each said single pulse.

3. A system as set forth in claim 1, wherein said phase-comparison processor includes:

adder means receiving the outputs of said first and second pulse compressors for adding said pulse-compressor outputs;

subtracter means receiving the outputs of said first and second pulse compressors for subtracting said pulse-compressor outputs;

phase-shifter means receiving the output of said subtracter for shifting the phase of the subtracter output;

multiplier means for receiving and multiplying the outputs of said subtracter means and said adder means to obtain an output having either a zero or a video pulse; and filter means receiving the output of said multiplier means for filtering and passing the video pulse of said multiplier means output.

* * * * *